(12) United States Patent
Silverbrook

(10) Patent No.: US 7,055,935 B2
(45) Date of Patent: *Jun. 6, 2006

(54) INK EJECTION DEVICES WITHIN AN INKJET PRINTER

(75) Inventor: Kia Silverbrook, Balmain (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/172,810

(22) Filed: Jul. 5, 2005

(65) Prior Publication Data

US 2005/0237363 A1    Oct. 27, 2005

Related U.S. Application Data

(63) Continuation of application No. 10/962,394, filed on Oct. 13, 2004, now Pat. No. 6,948,799, which is a continuation of application No. 10/713,072, filed on Nov. 17, 2003, now Pat. No. 6,824,251, which is a continuation of application No. 10/302,556, filed on Nov. 23, 2002, now Pat. No. 6,666,543, which is a continuation of application No. 10/120,346, filed on Apr. 12, 2002, now Pat. No. 6,582,059, which is a continuation-in-part of application No. 09/112,767, filed on Jul. 10, 1998, now Pat. No. 6,416,167.

(30) Foreign Application Priority Data

Jul. 15, 1997   (AU) ..................... PO7991
Mar. 25, 1998   (AU) ..................... PO2592

(51) Int. Cl.
  *B41J 2/04*   (2006.01)
  *B41J 2/05*   (2006.01)

(52) U.S. Cl. .......................... 347/54; 347/56

(58) Field of Classification Search ............... 347/20, 347/44, 47, 54, 56–59, 61–65, 67; 60/527–529; 310/306–307; 337/139–141; 251/129.01–129.02, 251/129.06
See application file for complete search history.

(56) References Cited

U.S. PATENT DOCUMENTS 4,423,401 A    12/1983 Mueller (Continued)

FOREIGN PATENT DOCUMENTS

DE    1648322 A    3/1971

(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157 *.

(Continued)

*Primary Examiner*—Juanita D. Stephens

(57) ABSTRACT

An ink ejection device of a printer has a substrate that incorporates drive circuitry and defines a fluid inlet channel. A nozzle chamber structure is positioned on the substrate and defines a nozzle chamber in fluid communication with the fluid inlet channel and a fluid ejection port in fluid communication with the nozzle chamber. A micro-electromechanical actuator is positioned on the substrate and is electrically connected to the drive circuitry to be displaced relative to the substrate on receipt of an electrical current from the drive circuitry. A fluid ejecting member is positioned in the nozzle chamber and is connected to the actuator to eject fluid from the ink ejection port on displacement of the actuator; and a covering formation is positioned on the substrate and is configured to enclose the actuator.

8 Claims, 2 Drawing Sheets

U.S. PATENT DOCUMENTS

| | | | |
|---|---|---|---|
| 4,553,393 A | 11/1985 | Ruoff | |
| 4,672,398 A | 6/1987 | Kuwabara et al. | |
| 4,737,802 A | 4/1988 | Mielke | |
| 4,864,824 A | 9/1989 | Gabriel et al. | |
| 5,029,805 A | 7/1991 | Albarda et al. | |
| 5,258,774 A | 11/1993 | Rogers | |
| 5,666,141 A | 9/1997 | Matoba et al. | |
| 5,719,604 A | 2/1998 | Inui et al. | |
| 6,180,427 B1 | 1/2001 | Silverbrook | |
| 6,425,651 B1 | 7/2002 | Silverbrook | |
| 6,588,882 B1 | 7/2003 | Silverbrook | |
| 6,666,543 B1 | 12/2003 | Silverbrook | |
| 6,834,939 B1 | 12/2004 | Silverbrook | |
| 6,948,799 B1 * | 9/2005 | Silverbrook | 347/54 |

FOREIGN PATENT DOCUMENTS

| | | |
|---|---|---|
| DE | 2905063 | 8/1980 |
| DE | 3245283 A | 6/1984 |
| DE | 3430155 A | 2/1986 |
| DE | 3716996 A | 12/1988 |
| DE | 3934280 A | 4/1990 |
| DE | 4328433 A | 3/1995 |
| DE | 19516997 A | 11/1995 |
| DE | 19517969 A | 11/1995 |
| DE | 19532913 A | 3/1996 |
| DE | 19623620 A1 | 12/1996 |
| DE | 19639717 A | 4/1997 |
| EP | 0092229 A | 10/1983 |
| EP | 0398031 A | 11/1990 |
| EP | 0427291 A | 5/1991 |
| EP | 0431338 A | 6/1991 |
| EP | 0478956 | 4/1992 |
| EP | 0506232 A | 9/1992 |
| EP | 0510648 A | 10/1992 |
| EP | 0627314 A | 12/1994 |
| EP | 0634273 A2 | 1/1995 |
| EP | 0713774 A2 | 5/1996 |
| EP | 0737580 A | 10/1996 |
| EP | 0750993 A | 1/1997 |
| EP | 0822590 | 12/1998 |
| FR | 2231076 | 12/1974 |
| GB | 792145 A | 3/1958 |
| GB | 1428239 A | 3/1976 |
| GB | 2262152 A | 6/1993 |
| JP | 58112747 A | 7/1983 |
| JP | 58116165 A | 7/1983 |
| JP | 61025849 A | 2/1986 |
| JP | 61268453 A | 11/1986 |
| JP | 01105746 A | 4/1989 |
| JP | 01115639 A | 5/1989 |
| JP | 01128839 A | 5/1989 |
| JP | 01257058 A | 10/1989 |
| JP | 01306254 A | 12/1989 |
| JP | 02050841 A | 2/1990 |
| JP | 210544 A | 4/1990 |
| JP | 292643 A | 4/1990 |
| JP | 02158348 A | 6/1990 |
| JP | 02162049 A | 6/1990 |
| JP | 2265752 A | 10/1990 |
| JP | 03655348 | 3/1991 |
| JP | 03112662 A | 5/1991 |
| JP | 03180350 A | 8/1991 |
| JP | 404001051 A | 1/1992 |
| JP | 04118241 A | 4/1992 |
| JP | 04126255 A | 4/1992 |
| JP | 04141429 A | 5/1992 |
| JP | 4353458 A | 12/1992 |
| JP | 04368851 A | 12/1992 |
| JP | 05284765 A | 10/1993 |
| JP | 05318724 A | 12/1993 |
| JP | 691865 A | 4/1994 |
| JP | 691866 A | 4/1994 |
| JP | 07314665 A | 12/1995 |
| WO | WO 94/18010 A | 8/1994 |
| WO | WO 97/12689 A | 4/1997 |
| WO | WO 2000/23279 A1 | 4/2000 |
| WO | WO 2001/89839 A | 11/2001 |

OTHER PUBLICATIONS

Noworolski J M et al: "Process for in-plane and out-of-plane single-crystal-silicon thermal microactuators" Sensors and Actuators A, Ch. Elsevier Sequoia S.A., Lausane, vol. 55, No. 1, (Jul 15, 1996), pp. 65-69, XP004077979 *.

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp. 142-147, XP000528408, ISBN: 0-7803-1834-X. *.

* cited by examiner

INK EJECTION DEVICES WITHIN AN INKJET PRINTER

CROSS-REFERENCE TO RELATED APPLICATIONS

The present application is a Continuation Application of U.S. application Ser. No. 10/962,394 filed on Oct. 13, 2004 now U.S. Pat. No. 6,948,799, which is a Continuation of U.S. application Ser. No. 10/713,072 filed Nov. 17, 2003, now U.S. Pat. No. 6,824,251, which is a Continuation Application of U.S. application Ser. No. 10/302,556 filed Nov. 23, 2002, issued as U.S. Pat. No. 6,666,543, which is a Continuation Application of U.S. Application Ser. No. 10/120,346 filed Apr. 12, 2002, issued as U.S. Pat. No. 6,582,059, which is a Continuation-in-Part Application of U.S. application Ser. No. 09/112,767 filed Jul. 10, 1998, issued as U.S. Pat. No. 6,416,167.

FIELD OF THE INVENTION

This invention relates to a micro-electromechanical fluid ejecting device. More particularly, this invention relates to a micro-electromechanical fluid ejecting device which incorporates a covering formation for a micro-electromechanical actuator.

REFERENCED PATENT APPLICATIONS

The following patents/patent applications are incorporated by reference.

| | | | | |
|---|---|---|---|---|
| 6,227,652 | 6,213,588 | 6,213,589 | 6,231,163 | 6,247,795 |
| 09/113,099 | 6,244,691 | 6,257,704 | 09/112,778 | 6,220,694 |
| 6,257,705 | 6,247,794 | 6,234,610 | 6,247,793 | 6,264,306 |
| 6,241,342 | 6,247,792 | 6,264,307 | 6,254,220 | 6,234,611 |
| 09/112,808 | 09/112,809 | 6,239,821 | 09/113,083 | 6,247,796 |
| 09/113,122 | 09/112,793 | 09/112,794 | 09/113,128 | 09/113,127 |
| 6,227,653 | 6,234,609 | 6,238,040 | 6,188,415 | 6,227,654 |
| 6,209,989 | 6,247,791 | 09/112,764 | 6,217,153 | 09/112,767 |
| 6,243,113 | 09/112,807 | 6,247,790 | 6,260,953 | 6,267,469 |
| 09/425,419 | 09/425,418 | 09/425,194 | 09/425,193 | 09/422,892 |
| 09/422,806 | 09/425,420 | 09/422,893 | 09/693,703 | 09/693,706 |
| 09/693,313 | 09/693,279 | 09/693,727 | 09/693,708 | 09/575,141 |
| 09/113,053 | 09/855,094 | 09/854,762 | 09/854,715 | 09/854,830 |
| 09/854,714 | 09/854,703 | 09/855,093 | 09/854,815 | 09/854,825 |
| 09/864,377 | 09/864,380 | 09/900,178 | 09/864,379 | 09/864,378 |
| 09/864,334 | 09/864,332 | 09/864,343 | 09/864,342 | 09/866,786 |
| 09/874,757 | 09/900,174 | 09/900,160 | 09/900,175 | 09/900,177 |
| 09/900,159 | 09/900,176 | 09/922,274 | 09/922,275 | 09/922,158 |
| 09/922,159 | 09/922,036 | 09/922,047 | 09/922,029 | 09/922,207 |
| 09/922,112 | 09/922,105 | 09/942,549 | 09/942,605 | 09/942,548 |
| 09/942,603 | 09/942,604 | | | |

BACKGROUND OF THE INVENTION

As set out in the above referenced applications/patents, the Applicant has spent a substantial amount of time and effort in developing printheads that incorporate micro electro-mechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

The Applicant has overcome substantial difficulties in achieving the necessary ink flow and ink drop separation within the ink jet printheads. A number of printhead chips that the Applicant has developed incorporate nozzle arrangements that each have a nozzle chamber with an ink ejection member positioned in the nozzle chamber. The ink ejection member is then displaceable within the nozzle chamber to eject ink from the nozzle chamber.

A particular difficulty that the Applicant addresses in the present invention is to do with the delicate nature of the various components that comprise each nozzle arrangement of the printhead chip. In the above referenced matters, the various components are often exposed as a requirement of their function. On the MEMS scale, the various components are well suited for their particular tasks and the Applicant has found them to be suitably robust.

However, on a macroscopic scale, the various components can easily be damaged by such factors as handling and ingress of microscopic detritus. This microscopic detritus can take the form of paper dust.

It is therefore desirable that a means be provided whereby the components are protected.

Applicant has found, however, that it is difficult to fabricate a suitable covering for the components while still achieving a transfer of force to an ink-ejecting component and efficient sealing of a nozzle chamber.

The Applicant has conceived this invention in order to address these difficulties.

SUMMARY OF THE INVENTION

According to a first aspect of the invention, there is provided a micro-electromechanical fluid ejection device that comprises
  a substrate that incorporates drive circuitry and defines a fluid inlet channel;
  a nozzle chamber structure that is positioned on the substrate and defines a nozzle chamber in fluid communication with the fluid inlet channel and a fluid ejection port in fluid communication with the nozzle chamber;
  a micro-electromechanical actuator that is positioned on the substrate and is electrically connected to the drive circuitry to be displaced relative to the substrate on receipt of an electrical current from the drive circuitry;
  a fluid ejecting member that is positioned in the nozzle chamber and is connected to the actuator to eject fluid from the ink ejection port on displacement of the actuator; and
  a covering formation that is positioned on the substrate and is configured to enclose the micro-electromechanical actuator.

The covering formation may include sidewalls that extend from the substrate and a roof wall that spans the substrate.

The actuator may be elongate and may have a fixed end that is connected to the substrate so that the actuator can receive an electrical signal from the drive circuitry and a movable end. The actuator may be configured so that the movable end is displaced relative to the substrate on receipt of the electrical signal.

A motion-transmitting structure may be fast with the movable end of the actuator. The motion-transmitting structure may be connected to the fluid ejecting member so that movement of the actuator is translated to the fluid ejecting member. The motion-transmitting structure may define part of the roof wall and may be spaced from a remaining part of the roof wall to allow for movement of the motion-transmitting structure.

The roof wall may define a cover that spans the walls to cover the elongate actuator, the motion-transmitting structure being shaped so that the cover and the motion-transmitting structure define generally co-planar surfaces that are spaced from, and generally parallel to the substrate. An opening may be defined between the cover and the motion-transmitting surface to facilitate relative displacement of the cover and the motion-transmitting surface.

The actuator may include at least one elongate actuator arm of a conductive material that is capable of thermal expansion to perform work. The actuator arm may have an active portion that defines a heating circuit that is connected to the drive circuitry layer to be resistively heated on receipt of the electrical signal from the drive circuitry layer and subsequently cooled on termination of the signal, and a passive portion which is insulated from the drive circuitry layer. The active and passive portions may be positioned with respect to each other so that the arm experiences differential thermal expansion and contraction reciprocally to displace the movable end of the actuator.

The motion-transmitting structure may define a lever mechanism and may have a fulcrum formation that is fast with the substrate and pivotal with respect to the substrate and a lever arm formation mounted on the fulcrum formation. An effort formation may be connected between the movable end of the actuator and the lever arm formation and a load formation may be connected between the lever arm formation and the fluid ejecting member.

The cover and the walls may define a unitary structure with the lever arm formation being connected to the walls with a pair of opposed torsion formations that are configured to twist as the lever formation is displaced.

According to a second aspect of the invention, there is provides a micro-electromechanical assembly that comprises a substrate that incorporates drive circuitry;

a micro-electromechanical device that is positioned on the substrate and is electrically connected to the drive circuitry to be driven by electrical signals generated by the drive circuitry; and a covering formation that is positioned on the substrate and is configured to enclose the micro-electromechanical device.

The covering formation may include sidewalls that extend from the substrate and a roof wall that spans the substrate.

The micro-electromechanical device may include an elongate actuator that has a fixed end that is connected to the substrate so that the actuator can receive an electrical signal from the drive circuitry and a movable end, the actuator being configured so that the movable end is displaced relative to the substrate on receipt of the electrical signal.

A motion-transmitting structure may be fast with the movable end of the actuator. The motion-transmitting structure may be connected to a working member so that movement of the actuator is translated to the working member. The motion-transmitting structure may define part of the roof wall and may be spaced from a remaining part of the roof wall to allow for movement of the motion-transmitting structure.

The roof wall may define a cover that spans the walls to cover the elongate actuator. The motion-transmitting structure may be shaped so that the cover and the motion-transmitting structure define generally co-planar surfaces that are spaced from, and generally parallel to the substrate. An opening may be defined between the cover and the motion-transmitting surface to facilitate relative displacement of the cover and the motion-transmitting surface.

The actuator may include at least one elongate actuator arm of a conductive material that is capable of thermal expansion to perform work. The actuator arm may have an active portion that defines a heating circuit that is connected to the drive circuitry layer to be resistively heated on receipt of the electrical signal from the drive circuitry layer and subsequently cooled on termination of the signal, and a passive portion which is insulated from the drive circuitry layer, the active and passive portions being positioned with respect to each other so that the arm experiences differential thermal expansion and contraction reciprocally to displace the movable end of the actuator.

The motion-transmitting structure may define a lever mechanism and may have a fulcrum formation that is fast with the substrate and pivotal with respect to the substrate and a lever arm formation mounted on the fulcrum formation. An effort formation may be connected between the movable end of the actuator and the lever arm formation and a load formation may be connected between the lever arm formation and the working member.

The lever arm formation, the cover and the walls may define a unitary structure with the lever arm formation being connected to the walls with a pair of opposed torsion formations that are configured to twist as the lever formation is displaced.

The sidewalls may include nozzle chamber walls, the roof wall defining a nozzle chamber together with the nozzle chamber walls and the motion-transmitting structure. The roof wall may define an ejection port in fluid communication with the nozzle chamber, the working member being in the form of a fluid ejection device that is positioned in the nozzle chamber, such that displacement of the working member results in ejection of fluid in the nozzle chamber from the ejection port. The substrate may define a fluid inlet channel in fluid communication with the nozzle chamber to supply the nozzle chamber with fluid.

According to a third aspect of the invention, there is provided a printhead chip for an inkjet printhead, the printhead chip comprising a substrate; and a plurality of nozzle arrangements that is positioned on the substrate, each nozzle arrangement comprising nozzle chamber walls and a roof that define a nozzle chamber with the roof defining an ink ejection port in fluid communication with the nozzle chamber;

an ink-ejecting member that is positioned in the nozzle chamber, the ink-ejecting member being displaceable towards and away from the ink ejection port so that a resultant fluctuation in ink pressure within the nozzle chamber results in an ejection of ink from the ink ejection port;

at least one work-transmitting structure that is displaceable with respect to the substrate and is connected to the ink-ejecting member so that displacement of the work transmitting structure results in displacement of the ink-ejecting member;

an actuator that is connected to the work-transmitting structure, the actuator being capable of displacing the work transmitting structure upon receipt of an electrical drive signal; and air chamber walls and a covering formation that is positioned over the actuator, the air chamber walls and the covering formation defining an air chamber in which the actuator is positioned, the roof, the work transmitting structure and the covering formation together defining a protective structure positioned in a common plane.

The invention is now described, by way of example, with reference to the accompanying drawings. The following description is not intended to limit the broad scope of the above summary.

DETAILED DESCRIPTION OF THE INVENTION

Figure 1:
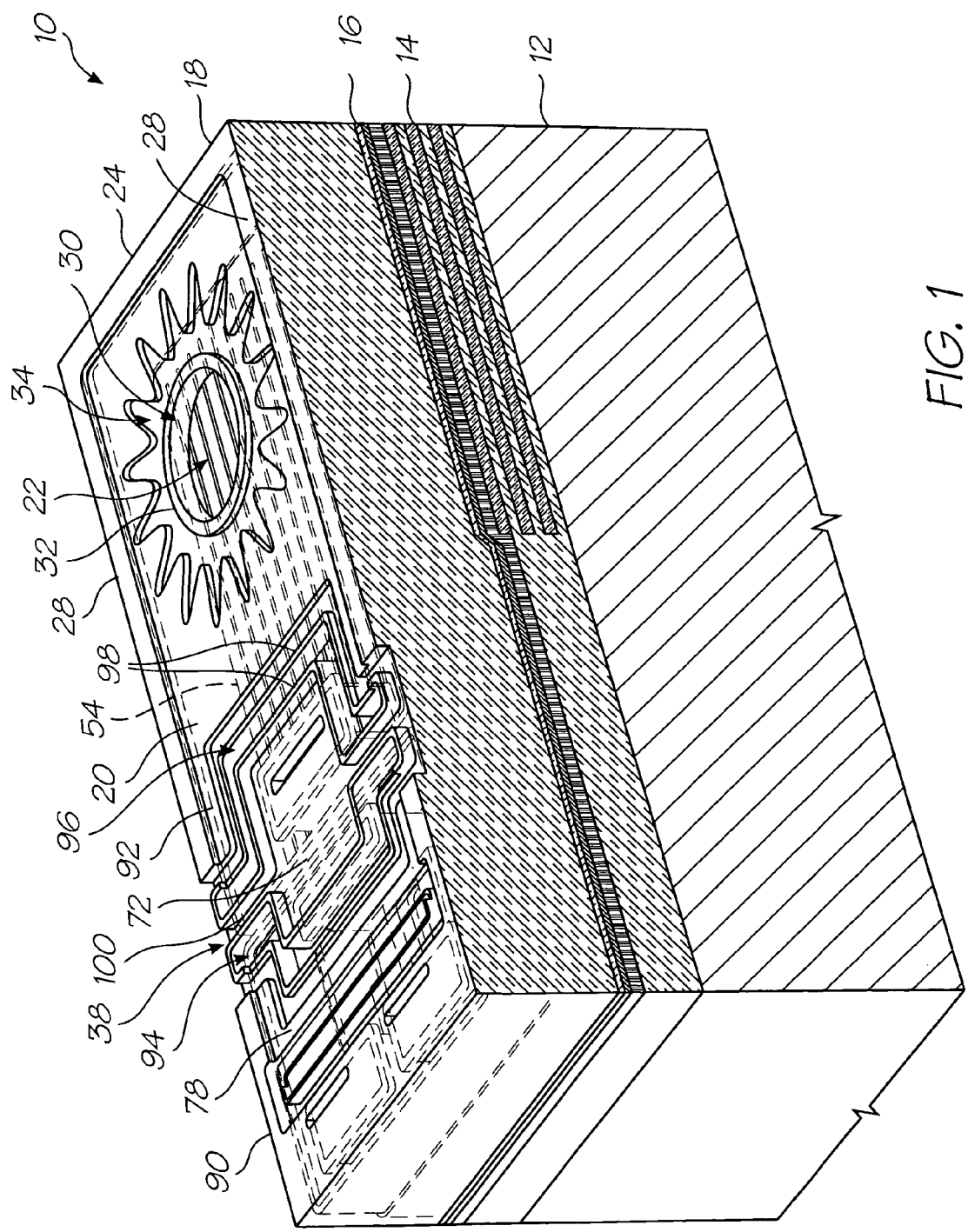
FIG. 1 shows a sectioned, three dimensional view of a nozzle arrangement of a printhead chip, in accordance with the invention, for an inkjet printhead.
Figure 2:
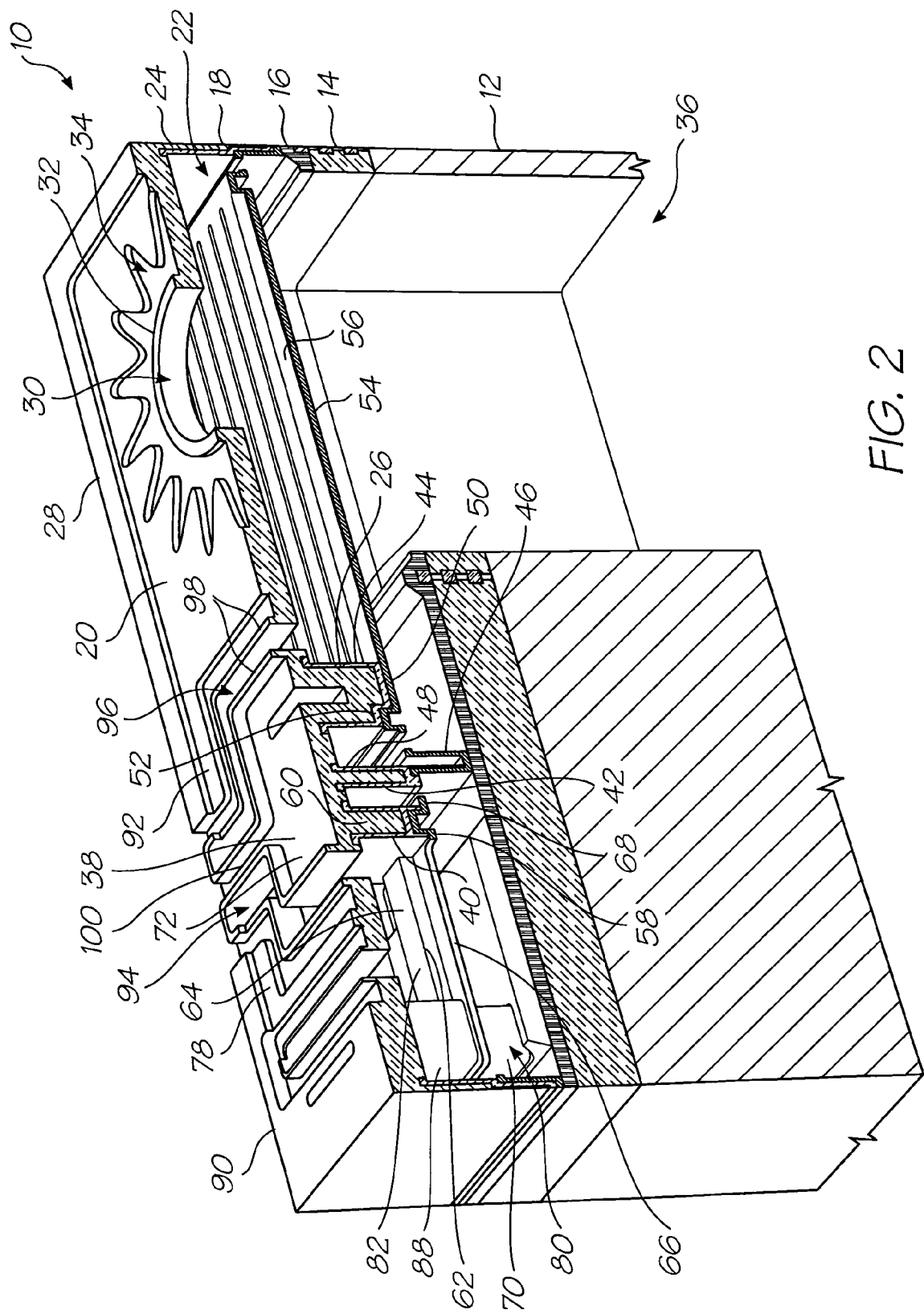
FIG. 2 shows a three dimensional view of the nozzle arrangement of FIG. 1.

In the drawings, reference numeral 10 generally indicates a nozzle arrangement for a first embodiment of an ink jet printhead chip, in accordance with the invention.

The nozzle arrangement 10 is one of a plurality of such nozzle arrangements formed on a silicon wafer substrate 12 to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 10 on the wafer substrate 12.

The printhead chip is the product of an integrated circuit fabrication technique. In particular, each nozzle arrangement 10 is the product of a MEMS—based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 10.

An electrical drive circuitry layer 14 is positioned on the silicon wafer substrate 12. The electrical drive circuitry layer 14 includes CMOS drive circuitry. The particular configuration of the CMOS drive circuitry is not important to this description and has therefore been shown schematically in the drawings. Suffice to say that it is connected to a suitable microprocessor and provides electrical current to the nozzle arrangement 10 upon receipt of an enabling signal from said suitable microprocessor. An example of a suitable microprocessor is described in the above referenced patents/patent applications. It follows that this level of detail will not be set out in this specification.

An ink passivation layer 16 is positioned on the drive circuitry layer 14. The ink passivation layer 16 can be of any suitable material, such as silicon nitride.

The nozzle arrangement 10 includes nozzle chamber walls 18 positioned on the ink passivation layer 16. A roof 20 is positioned on the nozzle chamber walls 18 so that the roof 20 and the nozzle chamber walls 18 define a nozzle chamber 22. The nozzle chamber walls 18 include a distal end wall 24, a proximal end wall 26 and a pair of opposed sidewalls 28. An ink ejection port 30 is defined in the roof 20 to be in fluid communication with the nozzle chamber 22. The roof 20 defines a nozzle rim 32 and a recess 34 positioned about the rim 32 to accommodate ink spread.

The walls 18 and the roof 20 are configured so that the nozzle chamber 22 is rectangular in plan.

A plurality of ink inlet channels 36, one of which is shown in the drawings, is defined through the substrate 12, the drive circuitry layer 14 and the ink passivation layer 16. The ink inlet channel 36 is in fluid communication with the nozzle chamber 18 so that ink can be supplied to the nozzle chamber 18.

The nozzle arrangement 10 includes a work-transmitting structure in the form of a lever mechanism 38. The lever mechanism 38 includes an effort formation 40, a fulcrum formation 42 and a load formation 44. The fulcrum formation 42 is interposed between the effort formation 40 and the load formation 44.

The fulcrum formation 42 is fast with the ink passivation layer 16. In particular, the fulcrum formation 42 is composite with a primary layer 46 and a secondary layer 48. The layers 46, 48 are configured so that the fulcrum formation 42 is resiliently deformable to permit pivotal movement of the fulcrum formation 42 with respect to the substrate 12. The layers 46, 48 can be of a number of materials that are used in integrated circuit fabrication. The Applicant has found that titanium aluminum nitride (TiAlN) is a suitable material for the layer 46 and that titanium is a suitable material for the layer 48.

The load formation 44 defines part of the proximal end wall 26. The load formation 44 is composite with a primary layer 50 and a secondary layer 52. As with the fulcrum formation 42, the layers 50, 52 can be of any of a number of materials that are used in integrated circuit fabrication. However, as set out above, the nozzle arrangement 10 is fabricated by using successive deposition and etching steps. It follows that it is convenient for the layers 50, 52 to be of the same material as the layers 46, 48. Thus, the layers 50, 52 can be of TiAlN and titanium, respectively.

The nozzle arrangement 10 includes an ink-ejecting member in the form of an elongate rectangular paddle 54. The paddle 54 is fixed to the load formation 44 and extends towards the distal end wall 24. Further, the paddle 54 is dimensioned to correspond generally with the nozzle chamber 22. It follows that displacement of the paddle 54 towards and away from the ink ejection port 30 with sufficient energy results in the ejection of an ink drop from the ink ejection port. The manner in which drop ejection is achieved is described in detail in the above referenced patents/applications and is therefore not discussed in any detail here.

To facilitate fabrication, the paddle 54 is of TiAlN. In particular, the paddle 54 is an extension of the layer 50 of the load formation 44 of the lever mechanism 38.

The paddle 54 has corrugations 56 to strengthen the paddle 54 against flexure during operation.

The effort formation 40 is also composite with a primary layer 58 and a secondary layer 60.

The layers 58, 60 can be of any of a number of materials that are used in integrated circuit fabrication. However, as set out above, the nozzle arrangement 10 is fabricated by using successive deposition and etching steps. It follows that it is convenient for the layers 58, 60 to be of the same material as the layers 46, 48. Thus, the layers 58, 60 can be of TiAlN and titanium, respectively.

The nozzle arrangement 10 includes an actuator in the form of a thermal bend actuator 62. The thermal bend actuator 62 is of a conductive material that is capable of being resistively heated. The conductive material has a coefficient of thermal expansion that is such that, when heated and subsequently cooled, the material is capable of expansion and contraction to an extent sufficient to perform work on a MEMS scale.

The thermal bend actuator 62 can be any of a number of thermal bend actuators described in the above patents/patent applications. In one example, the thermal bend actuator 62 includes an actuator arm 64 that has an active portion 82 and a passive portion. The active portion 82 has a pair of inner legs 66 and the passive portion is defined by a leg positioned on each side of the pair of inner legs 66. A bridge portion 68 interconnects the active legs 66 and the passive legs. Each leg 66 is fixed to one of a pair of anchor formations in the form of active anchors 70 that extend from the ink passivation layer 16. Each active anchor 70 is configured so that the legs 66 are electrically connected to the drive circuitry layer 14.

Each passive leg is fixed to one of a pair of anchor formations in the form of passive anchors 88 that are electrically isolated from the drive circuitry layer 14.

Thus, the legs 66 and the bridge portion 68 are configured so that when a current from the drive circuitry layer 14 is set up in the legs 66, the actuator arm 64 is subjected to differential heating. In particular, the actuator arm 64 is shaped so that the passive legs are interposed between at least a portion of the legs 66 and the substrate 12. It will be appreciated that this causes the actuator arm 64 to bend towards the substrate 12.

The bridge portion 68 therefore defines a working end of the actuator 62. In particular, the bridge portion 68 defines the primary layer 58 of the effort formation 40. Thus, the actuator 62 is of TiAlN. The Applicant has found this material to be well suited for the actuator 62.

The lever mechanism 38 includes a lever arm formation 72 positioned on, and fast with, the secondary layers 48, 52, 60 of the fulcrum formation 42, the load formation 44 and the effort formation 40, respectively. Thus, reciprocal movement of the actuator 62 towards and away from the substrate 12 is converted into reciprocal angular displacement of the paddle 54 via the lever mechanism 38 to eject ink drops from the ink ejection port 30.

Each active anchor 70 and passive anchor is also composite with a primary layer and a secondary layer. The layers can be of any of a number of materials that are used in integrated circuit fabrication. However, in order to facilitate fabrication, the primary layer is of TiAlN and the secondary layer is of titanium.

A cover formation 78 is positioned on the anchors 70, 88 to extend over and to cover the actuator 62. Air chamber walls 90 extend between the ink passivation layer 16 and the cover formation 78 so that the cover formation 78 and the air chamber walls 90 define an air chamber 80. Thus, the actuator 62 and the anchors are positioned in the air chamber 80.

The cover formation 78, the lever arm formation 72 and the roof 20 are in the form of a unitary protective structure 92 to inhibit damage to the nozzle arrangement 10.

The protective structure 92 can be one of a number of materials that are used in integrated circuit fabrication. The Applicant has found that silicon dioxide is particularly useful for this task.

It will be appreciated that it is necessary for the lever arm formation 72 to be displaced relative to the cover formation 78 and the roof 20. It follows that the cover formation 78 and the lever arm formation 72 are demarcated by a slotted opening 94 in fluid communication with the air chamber 80. The roof 20 and the lever arm formation 72 are demarcated by a slotted opening 96 in fluid communication with the nozzle chamber 22.

The lever arm formation 72 and the roof 20 together define ridges 98 that bound the slotted opening 96. Thus, when the nozzle chamber 22 is filled with ink, the ridges 98 define a fluidic seal during ink ejection. The ridges 98 serve to inhibit ink spreading by providing suitable adhesion surfaces for a meniscus formed by the ink.

The slotted openings 94, 96 demarcate a torsion formation 100 defined by the protective structure 92. The torsion formation 100 serves to support the lever mechanism 38 in position. Further, the torsion formation 100 is configured to experience twisting deformation in order to accommodate pivotal movement of the lever mechanism 38 during operation of the nozzle arrangement 10. The silicon dioxide of the protective structure 92 is resiliently flexible on a MEMS scale and is thus suitable for such repetitive distortion.

Applicant believes that this invention provides a printhead chip that is resistant to damage during handling. The primary reason for this is the provision of the protective structure 92, which covers the moving components of the nozzle arrangements of the printhead chip. The protective structure 92 is positioned in a common plane. It follows that when a plurality of the nozzle arrangements 10 are positioned together to define the printhead chip, the printhead chip presents a substantially uniform surface that is resistant to damage.

I claim:

1. A printer including a plurality of ink ejection devices, each device comprising:
   a substrate that incorporates drive circuitry and defines a fluid inlet channel;
   a nozzle chamber structure that is positioned on the substrate and defines a nozzle chamber in fluid communication with the fluid inlet channel and a fluid ejection port in fluid communication with the nozzle chamber;
   a micro-electromechanical actuator that is positioned on the substrate and is electrically connected to the drive circuitry to be displaced relative to the substrate on receipt of an electrical current from the drive circuitry;
   a fluid ejecting member that is positioned in the nozzle chamber and is connected to the actuator to eject fluid from the ink ejection port on displacement of the actuator; and
   a covering formation that is positioned on the substrate and is configured to enclose the micro-electromechanical actuator.

2. A printer as claimed in claim 1, in which the covering formation includes sidewalls that extend from the substrate and a roof wall that spans the substrate.

3. A printer as claimed in claim 2, in which the actuator is elongate and has a fixed end that is connected to the substrate so that the actuator can receive an electrical signal from the drive circuitry and a movable end, the actuator being configured so that the movable end is displaced relative to the substrate on receipt of the electrical signal.

4. A printer as claimed in claim 3, in which a motion-transmitting structure is fast with the movable end of the actuator, the motion-transmitting structure being connected to the fluid ejecting member so that movement of the actuator is translated to the fluid ejecting member, the motion-transmitting structure defining part of the roof wall and spaced from a remaining part of the roof wall to allow for movement of the motion-transmitting structure.

5. A printer as claimed in claim 4, in which the roof wall defines a cover that spans the walls to cover the elongate actuator, the motion-transmitting structure being shaped so that the cover and the motion-transmitting structure define generally co-planar surfaces that are spaced from, and generally parallel to the substrate, an opening being defined between the cover and the motion-transmitting surface to facilitate relative displacement of the cover and the motion-transmitting surface.

6. A printer as claimed in claim 4, in which the motion-transmitting structure defines a lever mechanism and has a fulcrum formation that is fast with the substrate and pivotal with respect to the substrate and a lever arm formation mounted on the fulcrum formation, an effort formation being connected between the movable end of the actuator and the lever arm formation and a load formation being connected between the lever arm formation and the fluid ejecting member.

7. A printer as claimed in claim 6, in which the lever arm formation, the cover and the walls define a unitary structure with the lever arm formation being connected to the walls with a pair of opposed torsion formations that are configured to twist as the lever formation is displaced.

8. A printer as claimed in claim 3, in which the actuator includes at least one elongate actuator arm of a conductive material that is capable of thermal expansion to perform work, the actuator arm having an active portion that defines a heating circuit that is connected to the drive circuitry layer to be resistively heated on receipt of the electrical signal from the drive circuitry layer and subsequently cooled on termination of the signal, and a passive portion which is insulated from the drive circuitry layer, the active and passive portions being positioned with respect to each other so that the arm experiences differential thermal expansion and contraction reciprocally to displace the movable end of the actuator.

* * * * *